Patented Jan. 28, 1936

2,028,879

UNITED STATES PATENT OFFICE 2,028,879

PREPARATION OF ALIZARIN AND ITS SALTS

Donald G. Rogers, Ridgewood, N. J., assignor to National Aniline and Chemical Company, Inc., New York, N. Y., a corporation of New York No Drawing. Application October 24, 1934, Serial No. 749,763

7 Claims. (Cl. 260—58)

This invention relates to a process for the production of 1:2-dihydroxyanthraquinone and its salts.

It is well known that 1,2-dihydroxyanthraquinone, that is, alizarin, can be produced by heating anthraquinone, or an alkali-metal salt of anthraquinone-2-sulfonic acid, with caustic alkali in the presence of an oxidizing agent.

According to the present invention, alizarin is produced by subjecting an anthraquinone compound having the composition indicated by the following general formula:

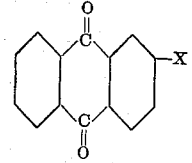

wherein X denotes a mercapto group (SMe) or a sulfinic acid group (SO$_2$Me), Me representing H or a metal, or a thioanthraquinonyl group of the following formula:

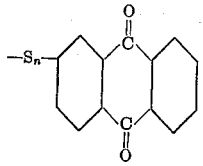

where $n$ stands for a number having the value of 2 or more, to the action of caustic alkali in the presence of an oxidizing agent.

The present invention particularly contemplates the production of alizarin and/or its salts from anthraquinonyl-2-mercaptan and from di-(anthraquinonyl)-2,2'-disulfide.

For the purposes of this invention it will be understood that the terms "mercapto", "mercaptan", "sulfinic acid", and "alizarin" include the salts, particularly the alkali-metal salts, as well as the hydrogen compounds.

In carrying out the present invention, anthraquinonyl-2-mercaptan or anthraquinone-2-sulfinic acid or di(anthraquinonyl)-2,2'-di- or polysulfide, or a mixture of two or more of these compounds, is heated with an aqueous solution of caustic alkali and a suitable oxidizing agent at an elevated temperature, for example from about 160° C. to 200° C., or more, preferably in a closed autoclave, for about 15 to 40 hours or more, or until the reaction is completed. Inorganic nitrates or chlorates, particularly the alkali-metal nitrates or chlorates, such as sodium or potassium nitrate or chlorate and the like, constitute suitable oxidizing agents and are preferably employed; but other oxidizing agents may be used. The alizarin thus produced may be isolated and recovered in any suitable manner. It is obtained in good yields and of high quality.

The following example, in which parts by weight are given, will serve to further illustrate the application of the present invention.

*Example.*—75 parts of anthraquinonyl-2-mercaptan, either in the form of paste or in the dry state, are added to 660 parts of a solution made by dissolving 190 parts caustic soda and 80 parts of sodium nitrate in 390 parts of water. The mixture, while being well stirred, is heated in a closed autoclave to a temperature of 180° C. until the conversion of the anthraquinonyl-2-mercaptan to the disodium salt of alizarin is substantially complete.

The reaction is substantially complete when a sample of the melt taken from the autoclave gives, after boiling with milk-of-lime, a filtrate which shows practically little or no color.

When the reaction is complete, the alizarin may be recovered from the reaction mixture by any of the usual methods. For example, the reaction mixture may be diluted with water, and the diluted mixture heated to boiling and treated with milk-of-lime whereby the insoluble calcium salt of alizarin is precipitated and any 2-hydroxyanthraquinone and/or any unreacted anthraquinonyl-2-mercaptan which may be present is retained in solution. Upon removing the insoluble calcium salt of alizarin from the solution, it is treated with an acid, e. g., hydrochloric acid, to convert it into free alizarin.

In a similar manner, anthraquinone-2-sulfinic acid or di-(anthraquinonyl)-2,2'-di- or polysulfide may be converted into alizarin. The anthraquinonyl polysulfides may be prepared by dissolving sulfur in the monosulfide or, as to the higher polysulfides, in the disulfide.

I claim:

1. The process of preparing alizarin, which comprises subjecting a substance having the following general formula:

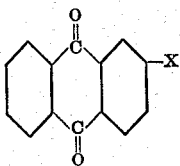

wherein X denotes a mercapto group, a sulfinic acid group, or a thioanthraquinonyl group of the following general formula:

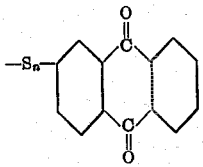

where $n$ stands for a number having a value of 2 or more, to the action of caustic alkali in the presence of an oxidizing agent.

2. The process of preparing alizarin, which comprises reacting a substance having the following general formula:

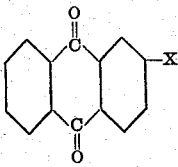

wherein X denotes a mercapto group, a sulfinic acid group, or a thioanthraquinonyl group of the following general formula:

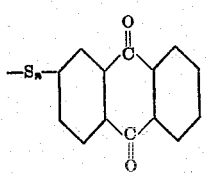

where $n$ represents a number having a value of 2 or more, with caustic soda in the presence of an oxidizing agent selected from the group consisting of an alkali metal nitrate and an alkali metal chlorate.

3. The process of preparing alizarin, which comprises heating to an elevated temperature a substance having the following general formula:

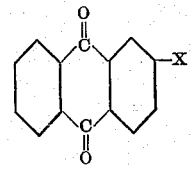

in which X stands for a mercapto group, a sulfinic acid group, or a thioanthraquinonyl group having the following general formula:

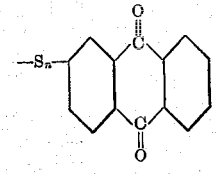

where $n$ represents a number having the numerical value of 2 or more, with an alkali metal hydroxide and an oxidizing agent selected from the group consisting of an inorganic nitrate and an inorganic chlorate, and subsequently recovering alizarin from the reaction mixture.

4. The process of preparing alizarin, which comprises reacting a member of the group consisting of anthraquinonyl-2-mercaptan and di-(anthraquinonyl)-2,2'-disulfide with caustic alkali in the presence of an oxidizing agent.

5. The process of preparing alizarin, which comprises reacting a member of the group consisting of anthraquinonyl-2-mercaptan and di-(anthraquinonyl)-2,2'-disulfide with sodium hydroxide in the presence of water and of an oxidizing agent selected from the group consisting of an alkali metal nitrate and an alkali metal chlorate.

6. The process of preparing alizarin, which comprises heating a mixture of anthraquinonyl-2-mercaptan, sodium hydroxide, and sodium nitrate in the presence of water to a temperature of about 160° to about 200° C., and subsequently recovering alizarin from the reaction mixture.

7. The process of preparing alizarin, which comprises heating a mixture of di(anthraquinonyl)-2,2'-disulfide, sodium hydroxide, and sodium nitrate in the presence of water to a temperature of about 160° C. to about 200° C., and subsequently recovering alizarin from the reaction mixture.

DONALD G. ROGERS.